United States Patent [19]
McCracken

[11] Patent Number: 5,492,160
[45] Date of Patent: Feb. 20, 1996

[54] UNIFORM MORTISE AND TENON GENERATING SYSTEM

[76] Inventor: James L. McCracken, 2518 Buckhill Ct., San Jose, Calif. 95148

[21] Appl. No.: 252,278

[22] Filed: Jun. 1, 1994

[51] Int. Cl.⁶ .............................. B27M 1/08; B27C 5/10; B27F 1/00
[52] U.S. Cl. ...................... 144/367; 144/84; 144/198 R; 144/203; 144/365; 144/372; 144/93 R; 144/144.5 R; 408/26; 408/241 G; 409/130
[58] Field of Search .................................... 144/1 R, 2 R, 144/3 R, 35 R, 82, 83, 84, 87, 133 R, 134 D, 136 C, 144 R, 144.5, 198 R, 203, 204, 365, 367, 372; 409/125, 130, 182; 408/22, 26, 241 R, 241 B, 241 G; 33/197

[56] References Cited

U.S. PATENT DOCUMENTS

| | | | |
|---|---|---|---|
| 3,109,466 | 11/1963 | Jones | 144/87 |
| 3,223,132 | 12/1965 | Erne | 144/144.5 |
| 3,789,892 | 2/1974 | Converse et al. | 144/144.5 |
| 4,479,522 | 10/1984 | Peterson et al. | 144/144.5 R |
| 4,749,013 | 7/1988 | Ducate, Sr. | 144/145 R |
| 4,995,435 | 2/1991 | Godfrey | 144/87 |
| 5,123,463 | 6/1992 | Grisley | 144/84 |
| 5,285,832 | 2/1994 | Gibson | 144/84 |
| 5,318,082 | 7/1994 | Von Hollen | 144/144.5 |

OTHER PUBLICATIONS

Warner, Patrick, "End–Work Router Fixture," *Fine Woodworking*, Sep. 1992.

Primary Examiner—W. Donald Bray
Attorney, Agent, or Firm—Michael J. Hughes; Bradley T. Sako

[57] ABSTRACT

A mortise and tenon generating system 10 having a removable tenon template 12 that attaches to the work piece. A router 26 utilizing a router bit 18 with a bearing collar 30 is guided so that the bearing collar 30 circumferentially contacts a guide edge 54 on the tenon template 12 and machines the tenon 36 out of the work piece 18. A router jig 16 with a tilting table 100 having a machining opening 118 is provided for supporting the router 26 and receiving the router bit 28. The router jig 16 also includes a clamp assembly 98 with a rotatable guide member 168 for receiving the work piece. The tilting table 100 and rotatable guide member 168 allow the work piece to be oriented at a variety of angles with respect to the router bit 28, for the creation of angled and compound angled tenons and/or mortises.

13 Claims, 7 Drawing Sheets

UNIFORM MORTISE AND TENON GENERATING SYSTEM

TECHNICAL FIELD

This invention relates generally to machining systems, and more particularly to systems for generating mortises and tenons.

BACKGROUND ART

The construction of furniture and other objects from wood or wood-like materials requires the joining of different, individual pieces. Such methods have evolved over thousands of years. More basic methods of joining involve the insertion of metal objects between the two pieces, such as nails or screws. A more artful joining method utilizes a dowel inserted into a hole common to both pieces. The most elegant joining methods however, involve forming the pieces themselves into tightly fitting, interlocking shapes. Such methods include dovetail joints and mortise and tenon joints.

The utilization of mortise and tenon joints is well known in the art, particularly in the creation of wooden furniture. Mortise and tenon joints can be classified by the angle from which the tenon work piece extends from the mortise work piece (ninety degree, angled, or compound angled). The prevalence of such joints has led to various methods and apparatuses for creating mortises and tenons. The quicker methods take advantage of power tools such as routers. The router bit is guided around a piece of wood to shape the desired tenon.

One such method and apparatus is set forth in U.S. Pat. No. 4,479,523 issued to Peterson et al. While providing an accurate method for generating a mortise and tenon, the Peterson et al. invention requires a number of varying templates, a stage, stops, blocks, and clamps. Compound angle joints in particular require the creation of a "double angle stop block" to arrange the work pieces at the desired compound angle. The device of the '523 patent requires the work piece to be secured to the stage, against a stop by a number of clamps and an angled block if necessary. A first router pass machines half of the tenon. The template is then flipped, and a second pass finishes the tenon. This apparatus and method lacks versatility as well as requiring substantial setup time and sizable equipment.

A second system is illustrated by U.S. Pat. No. 4,749,013 issued to Ducate, Sr. The woodworking machine set forth in this patent utilizes a first tiltable stage that is capable of movement along two orthogonal horizontal axes, and a second, adjacent, vertically disposed stage, capable of movement along a vertical axis. The second stage contains a rotary motor and a perpendicularly projecting stylus. The woodworking machine can be prepared to machine tenons by equipping the rotary motor with a router bit and attaching a template to the first stage so that it is disposed parallel the second plane. The work piece is clamped to the first stage, and the first stage tilted and otherwise moved about the horizontal plane for proper alignment with the router bit. The first and second stages are then manipulated to guide the stylus within, or around the template to machine the desired shape. This woodworking system requires sizable equipment and set up time. The work piece must be aligned with a remotely positioned stylus and template, and both stages must be moved to accomplish the machining. This complicates the task of machining.

An article by Patrick Warner, titled "End-Work Router Fixture" appearing in *Fine Woodworking*, September 1992, sets forth an apparatus for machining the end of a board. This device includes a router platform having a window and a clamping board with an indexing fence. The device can generate angled tenons, but not compound angle tenons. The generation of varying tenons also requires a large overlay template for each different tenon on the platform, or variably sized routers. This lack of versatility makes the creation of differently shaped tenons a complicated endeavor.

None of the prior art sufficiently addresses the need for a simple and versatile mortise and tenon generating system having a minimal number of components.

SUMMARY OF THE INVENTION

Accordingly, it is an object of the present invention to provide a mortise and tenon generating system that requires a minimal number of components.

It is another object of the present invention to provide a mortise and tenon generating system that requires components of minimal size.

It is yet another object of the present invention to provide a cohesive mortise and tenon generating system which may be used with a wide variety of templates to generate a wide variety of tenons and corresponding mortises.

It is a further object of the present invention to provide a mortise and tenon generating system that does not require a large template.

It is still another object of the present invention to provide a quick and precise system for generating mortises and tenons.

It is a still further object of the invention to provide a system of generating mortises and tenons that is easy to implement.

Briefly, a preferred embodiment of the present invention is mortise and tenon generating system for machining a mortise and tenon out of work pieces. The system includes, in its basic configuration, a variety of insertable tenon templates, a drill guide, and a router jig.

In the preferred embodiment, the tenon template having the desire shape is selected from a range of available templates. The template has a top surface, a bottom surface, and a surrounding side surface. The top and bottom surfaces are identical, having the same shape as the desired cross sectional shape of the tenon to be created. The tenon template is attached directly to the work piece, with the bottom surface abutting the work piece. This arrangement makes the task of machining the tenon easier and less complex. The template is secured to the work piece by two small posts extending perpendicularly from the bottom surface of each template. These posts insert into, and snugly fit within, two corresponding holes on the work piece.

A number of templates are provided with the system for the generation of tenons in a variety of shapes. The distance between the small posts on the templates is standardized. This distance corresponds to the distance between the drill holes created on the work piece.

A drill and drill guide are used to create the two drill holes in the work piece. The drill guide can be preset with spacers to accommodate work pieces of standard thicknesses. The drill guide is also adjustable to fit work pieces cut at angles other than ninety degrees, as is necessary for the creation of angled, and compound angled mortise and tenon joints.

The work piece, with the template attached, is situated within the router jig. The preferred, deluxe router jig has a variable angle table surface with a machining hole within it. Below the table surface is a clamp arrangement for receiving and clamping into place the work piece. The table is set at an angle so that its surface is parallel to the top surface of the tenon template. Using the template as a guide, the router is guided so that the router bit travels around the surrounding side surface of the tenon template, forming the tenon out of the work piece.

The clamp arrangement includes a radially pivoting vertical stop on one face of the clamp. This stop allows the work piece to be positioned within the clamp at a variety of angles. Thus, if a tenon is formed with the table at an angle other than zero degrees, but the vertical stop is at ninety degrees, an angled tenon is created. If the table is at an angle other than ninety degrees, and the vertical stop is also at an angle other than vertical, a compound angle tenon is created.

An alternate embodiment differs from the preferred embodiment in that it includes three identical tenon templates and a router attachment. The router jig has a table top with a slidable portion. The slidable portion has two pairs of rear holes and a pair of front holes for receiving the three templates. The router attachment is attached to the face of the router. Three template guides extend perpendicularly from the router guide.

The work piece is placed within the router jig, and the tenon is then machined by moving the router so that the template guides follow the surrounding side surfaces of the templates, and simultaneously, the router bit follows the same pattern as the template guides, machining into the work piece, and forming the tenon. In this case, no template is directly attached to the work piece.

Mortises are formed the same way in both the preferred embodiment and the alternate embodiment. The mortise work piece is clamped within the clamping arrangement of the router jig. The angle of the mortise work piece can be set with the router jig vertical stop. The table angle may also be adjusted. This allows the mortise to be created at a variety of angles, including compound angles.

An advantage of the present invention is that it provides a mortise and tenon generating system that is quick and easy to set up.

Another advantage of the present invention is that it provides a mortise and tenon generating system that can generate tenons at angles other than ninety degrees with minimal components.

Yet another advantage of the present invention is that common or repetitive work techniques may be used to generate a wide variety of mortises and tenons.

A still further advantage of the present invention is that it provides a mortise and tenon generating system that requires minimal alignment of the work piece prior to machining.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE OF CARRYING OUT THE INVENTION

The preferred embodiment of the present invention is a uniform mortise and tenon generation system adapted to be utilized to form a tenon, or similar protrusion, on a work piece of workable material such as wood. The system includes component parts which are adapted to be utilized with the work piece in sequential fashion, and does not form a unitary apparatus.

Figure 1:
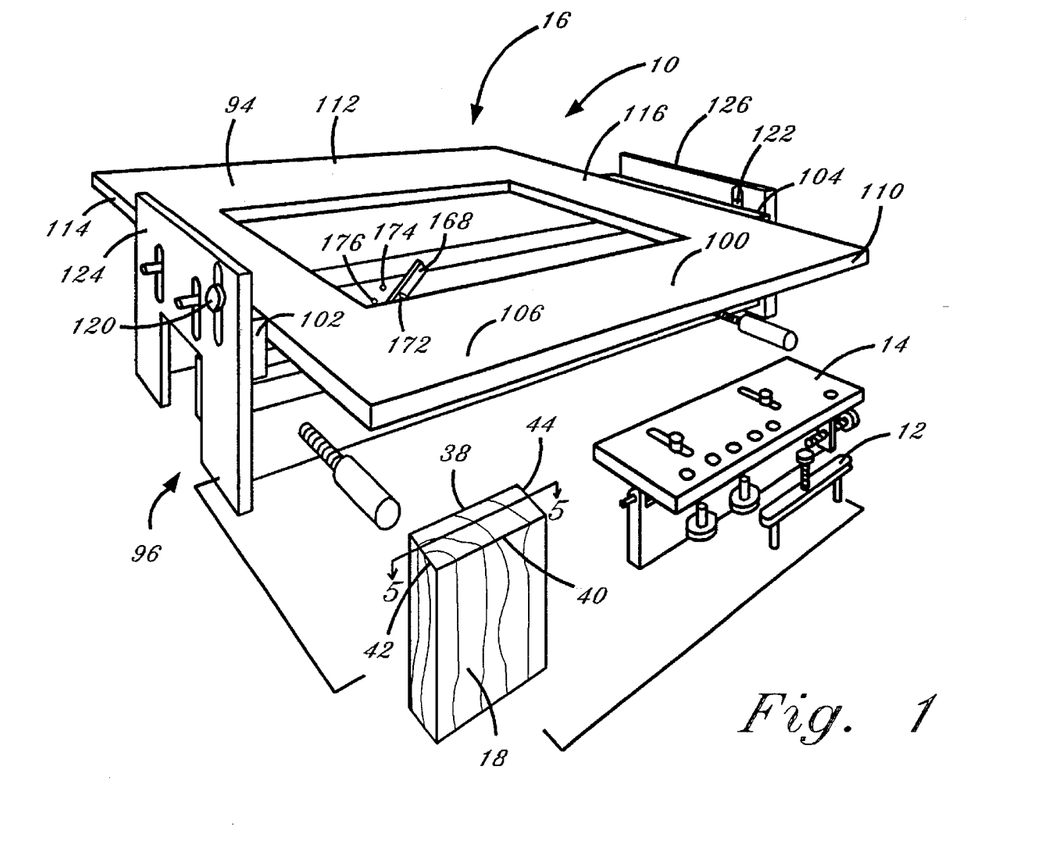
FIG. 1 is a perspective view of the preferred embodiment showing the primary components and a raw work piece in an arbitrary array.

Referring now to FIG. 1, the preferred embodiment of the tenon generating system is shown and designated by the general reference character 10. As set forth in the figure, the mortise and tenon generating system 10 includes a tenon template 12, a drill guide 14 and a router jig 16. FIG. 1 also illustrates a typical work piece 18 on which a tenon will be formed.

Figure 2:
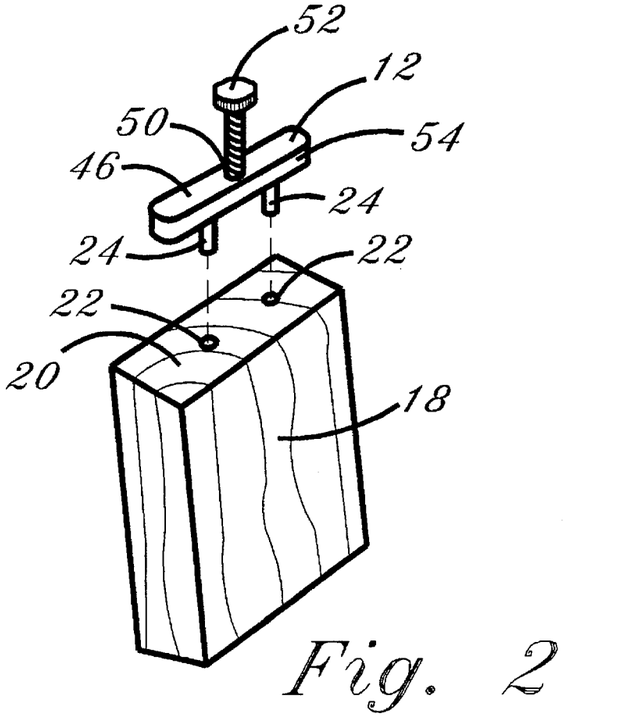
FIG. 2 is an exploded perspective view of the template and the work piece with the insertion holes therein.
Figure 3:
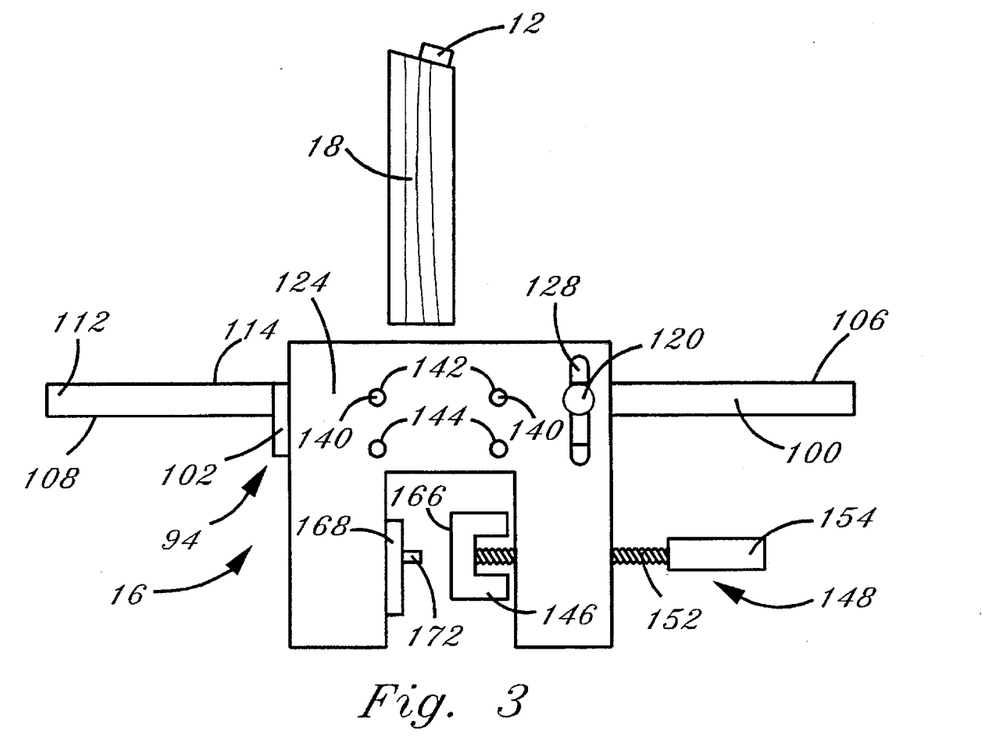
FIG. 3 is a side elevational view of the work piece and the router jig, with template attached, suspended above the router jig.
Figure 4:
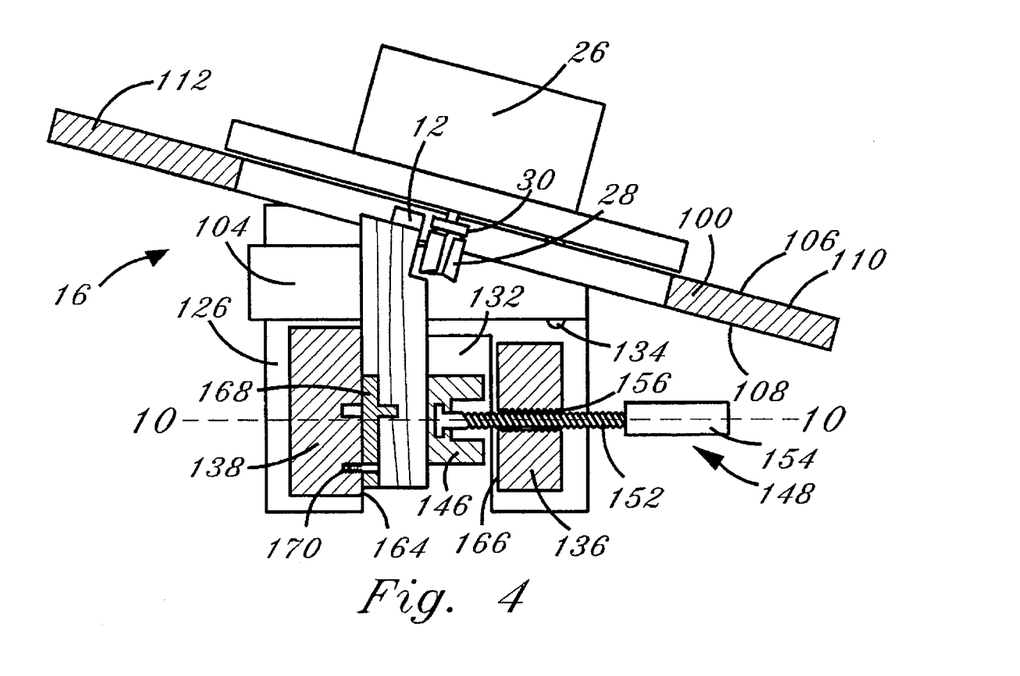
FIG. 4 is a side cross sectional view of the router jig, shown in a tilted-table orientation with the partially machined work piece clamped therein.
Figure 5:
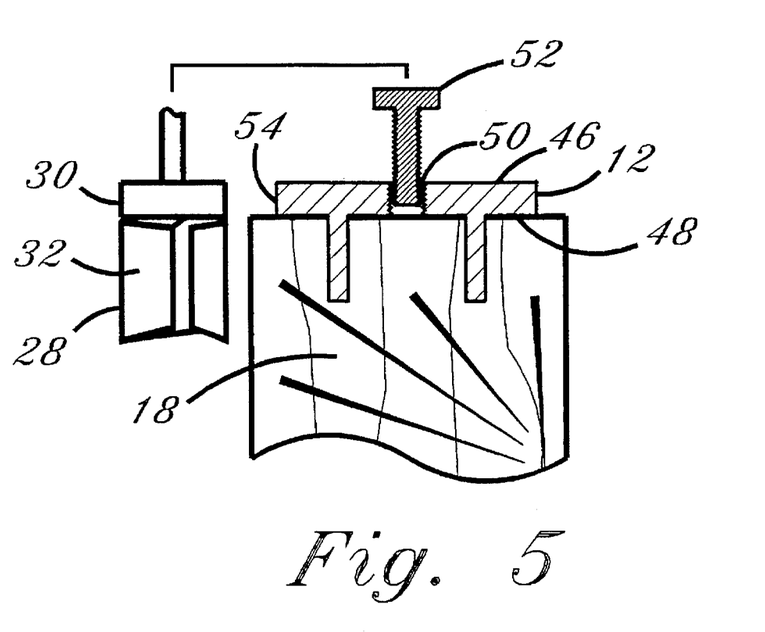
FIG. 5 is a front cross sectional view taken along line 5—5 of FIG. 1, of a work piece with a tenon attached, and a side view of a router bit.

In the preferred embodiment 10 of the present invention the work piece 18 is created by a first straight cut with a saw to create a template plane 20 on the work piece 18. The template plane 20 should be perpendicular to the direction of the desired tenon. Two insertion holes 22 are drilled into the template plane 20 using the drill guide 14. The tenon template 12 having the desired shape is selected and attached to the work piece 18 by guiding a pair of guide pins 24 on the tenon template 12 into the two insertion holes 22 in the template plane 20 as shown in FIG. 2. As shown in FIGS. 3 and 4, the work piece 18, with tenon template 12 attached, is then secured within the router jig 16. A router 26, equipped with a router bit 28 having a bearing collar 30 (as shown in FIGS. 4 and 5), is used to form a tenon. The router bit 28 is guided so that the bearing collar 30 contacts, and is guided around, the tenon template 12. A cutting portion 32 of the router bit 28 machines the work piece 18 as it is guided around the tenon template 12.

Figure 6:
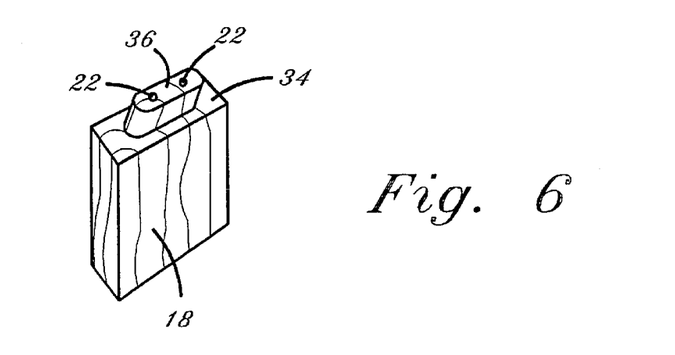
FIG. 6 is a perspective view of a finished work piece having a tenon.

FIG. 6 illustrates a finished work piece 18 having a shoulder 34 and a finished angled tenon 36. Any tenon formed with the preferred embodiment of the present system will, in final form, include the two characteristic insertion holes 22. The operation and components of the preferred embodiment 10 are detailed below.

As shown in FIG. 1, in addition to the template plane 20, the work piece 18 includes a first side surface 38, a second side surface 40, a first end surface 42, and a second end surface 44. The template plane 20 is created to receive the tenon template 12. As shown in FIGS. 2 and 5, in the preferred embodiment 10 the tenon template 12 includes a template top 46, a template bottom 48, a threaded aperture 50, a release screw 52, and the two guide pins 24. A template guide edge 54 extends between the template top 46 and the template bottom 48. The guide edge 54 of the template 12 has the perimeter shape of the finished tenon 36. As shown in the figures, the two guide pins 24 extend in a perpendicular direction from the template bottom 48. The guide pins 24 are straight, and in the preferred embodiment 10, circular in cross section.

The way in which the tenon template 12 is attached to the work piece 18 is best illustrated in FIGS. 2 and 5. In the preferred embodiment 10, the release screw 52 is removed, and the guide pins 24 are inserted into the two insertion holes 22 in the template plane 20 of the work piece 18. The insertion holes 22 are formed with a standard drill (not shown in the figures). The distance between the insertion holes 22 is the same as the distance between the guide pins 24. The dimensions of the guide pins 24 and the insertion holes 22 are such that when the guide pins 24 are fully inserted into the insertion holes 22, the fit is snug, and the tenon template 12 is held firmly in place. When the guide pins 24 are fully inserted, the template bottom 48 abuts the template plane 20.

Figure 7A:
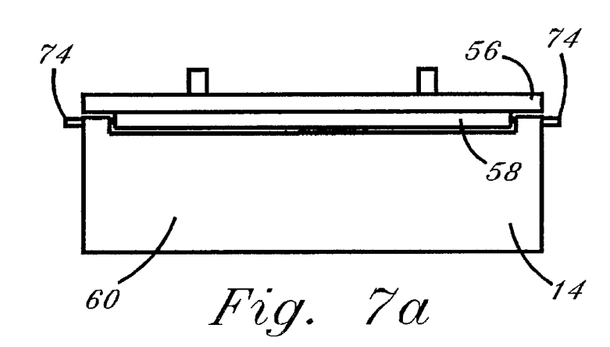
FIG. 7a is a front elevational view and FIG. 7b is a side elevational view of the drill guide.
Figure 7B:
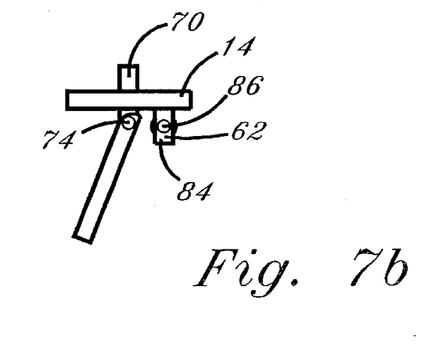
Figure 8:
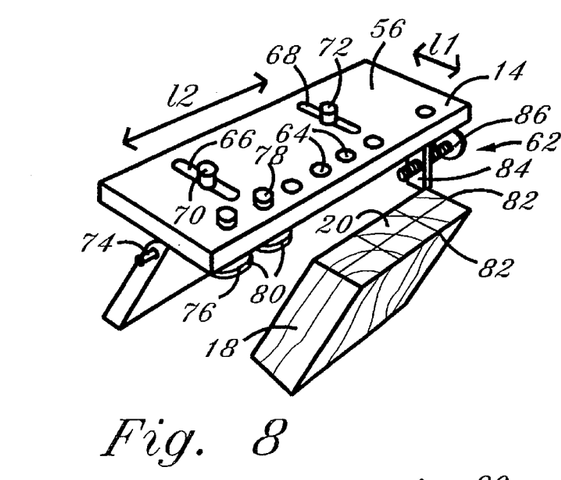
FIG. 8 is a perspective view of the work piece positioned at a reverse angle to that of FIGS. 1, 2, and 6, and of the drill template with two spacer inserts therein.
Figure 9:
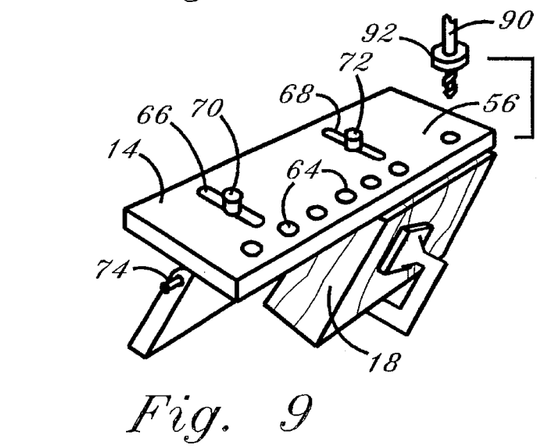
FIG. 9 is a perspective view of the work piece positioned at the same angle as FIG. 8, clamped to the drill template with the drill bit positioned over the first guide hole.

While the insertion holes 22 can be created by a variety of different drilling methods, the preferred embodiment utilizes a specialized drill guide 14. As shown in FIGS. 7a, 7b, 8 and 9, the drill guide 14 includes a guidehole plate 56 connected by a hinge 58 to an edge locator plate 60. It should be noted that the work piece 18 in FIGS. 8 and 9 is positioned at a reverse angle to the work piece 18 in FIGS. 1, 2 and 6. An end locator 62 extends downward from the guidehole plate 56. The guidehole plate 56 has a number of drill guideholes 64, a first slide groove 66, and a second slide groove 68. The hinge 58 also extends in a downward direction from the guidehole plate 56. A first locking screw 70 and a second locking screw 72 extend through the first and second slide grooves (66 and 68) of the guidehole plate 56 into the hinge 58. The locking screws (70 and 72) control the sliding movement of the edge locator plate 60 with respect to the guidehole plate 56. When the two locking screws (70 and 72) are loosened, the edge locator plate 60 is free to slide in a lateral direction (indicated by the arrow "11" of FIG. 8), and when the locking screws (70 and 72) are tightened, the edge locator plate 60 is immobile in the lateral direction.

Two hinge screws 74 extend through the edge locator plate 60 and into the hinge 58. When the hinge screws 74 are loose, the edge locator plate 60 is free to radially swing about the hinge 58 with respect to the guidehole plate 56. Conversely, when the hinge screws 74 are tightened, the edge locator plate 60 can be frozen at any angular position between 0 and 90 degrees with respect to the guidehole plate 56.

The guidehole plate 56 is used to precisely align the drill guideholes 64 over the template plane 20 of the work piece 18. As shown in FIG. 8, in the preferred embodiment 10, the drill guide 14 includes a number of spacer inserts 76 that fit within the drill guideholes 64. Each spacer insert 76 includes a spacer pin portion 78 and a spacer head portion 80. The spacer head portions 80 have diameters corresponding to common work piece 18 thicknesses (i.e. ½", ¾", 1"). The two spacer inserts 76 are used to laterally position the edge locator plate 60. The spacer inserts 76 are set in the drill guide 14 by inserting the pin portions 78 of two spacer inserts 76 into any two drill guideholes 64 until the spacer head portions 80 come into contact with the guidehole plate 56. The two locking screws (70 and 72) are loosened, and the edge locator plate 60 is slid in the lateral direction until it contacts the spacer head portions 80. The two locking screws (70 and 72) are then tightened, and the edge locator plate 60 is locked in place. Once the locking screws (70 and 72) are locked, the spacers inserts 76 are removed, and the edge locator plate 60 is in a position to accommodate work pieces 18 having the same thicknesses as the spacer head portions 80 used. The drill guideholes 64 of the guidehole plate 56 will then be properly aligned on the template plane 20 of the work piece 18.

One skilled in the art will recognize that the spacer inserts 76 are a matter of convenience only. The desired lateral spacing of the edge locator plate 60 can also be accomplished by simply drawing line 82 with a pencil or the like, on the template plane 20. The work piece 18 can then be positioned with the template plane 20 abutting the guidehole plate 56, as shown in FIG. 9. The work piece 18 will be in position when the alignment lines 82 are visible in the drill guideholes 64. The edge locator plate 60 can then be moved in the lateral direction until it contacts the work piece 18, where it is locked into position using the locking screws (70 and 72).

For the generation of tenons at angles other than ninety degrees, such as the finished tenon 36 shown in FIG. 6, the edge locator plate 60 can be rotated and locked into place with the hinge screw 74 so that edge locator plate 60 is flush with the first side surface 38 of the work piece 18, as illustrated in FIG. 9.

Once the work piece is aligned within the drill guide 14 in the lateral direction and the edge locator plate 60 is properly positioned, the work piece 18 must be aligned in the longitudinal direction (indicated by the arrow "12" in FIG. 8) using the end locator 62. The end locator 62 of the preferred embodiment 10 has an end post 84 depending from the guidehole plate 56. An end screw 86 extends through the end post 84 parallel to the guidehole plate 56. The end screw 86 is screwed into or out of the end post 84 to align the work piece 18 in the longitudinal direction.

As shown in FIG. 9, once the work piece 18 is in the desired longitudinal and lateral alignment with the drill guide 14, the work piece 18 is positioned below the guidehole plate 56, underneath the drill guideholes 64. The work piece 18 is clamped with a standard "C" clamp 88 to the drill guide 14 and is ready for drilling.

Referring now to FIG. 9, the preferred embodiment 10 of the present invention uses a drill (not shown) with a drill bit 90 having a stop collar 92. The stop collar 92 ensures the insertion holes 22 created by the drill bit 90 are of the desired depth. The drill bit 90 is guided into the desired guidehole 64 and the insertion holes 22 are drilled into the template plane 20.

The drill guideholes 64 are laterally spaced from each other at distances corresponding to the distance between the guide pins 24 on the tenon template 12. Once the insertion holes 22 are created, the work piece 18 is then ready to receive the tenon template 12.

As is best illustrated in FIGS. 2 and 5, the tenon template 12 is positioned on the work piece 18 by inserting the guide pins 24 into the insertion holes 22 until the template bottom 48 contacts the template plane 20. The tenon template 12 is held in place by the friction fit of the guide pins 24 within the insertion holes 22.

Although the tenon template 12 of the preferred embodiment 10 has a rectangular shape with rounded corners, it would clear to one skilled in the art that the tenon template 12 could be a variety different shapes. Templates 12 could be constructed in any number of shapes, such as an oval, square, or a rectangle, for example. As long as the template 12 includes a surrounding guide edge 54, the template 12 could have virtually any shape, provided that all internal radii of the shape are larger than the router bearing collar 30. While the guide pins 24 of the templates 12 are circular in cross section, it would obvious to one skilled in the art that the guide pins 24 could have a variety of cross sectional variations. Such variations can reduce the total contact surface area between the guide pin 24 and its associated insertion hole 22, facilitating insertion and removal of the template 12 from the work piece 18.

The number of guide pins 24 is not necessarily limited to two, either. A template 12 could employ more than two guide pins 24, provided corresponding insertion holes 22 are created on the template plane 20 of the work piece 18. A template 20 could even have a single guide pin 24. Such a configuration is particularly suited to circular templates. The method of attachment need not be limited to interfitting guide pins 24 and insertion holes 22. The templates 12 could be screwed or nailed to the work piece 18 by way of two apertures in the template 12. Such a template 12 could also be used in combination with loose guide pins 24. Guide pins 24 could be inserted into the insertion holes 22 and the template 12 slipped onto the guide pins 24. Alternatively, glue could be used to attach a template 12 without guide pins 24.

Once the tenon template 12 is secured, the release screw 52 removed, and the work piece 18 is positioned in the router jig 16 for machining. The router jig 16 is set forth in the perspective view of FIG. 1, as well as the side elevational and side cross sectional views of FIGS. 3 and 4. In the preferred embodiment 10, the router jig 16 includes a table assembly 94, a stage 96, and a clamp assembly 98.

The table assembly 94 includes a table 100, a left bracket 102, and a right bracket 104. The table 100 is rectangular, having a table top 106, a table bottom 108, a table front 110, a table rear 112, a table left side 114, and a table right side 116. A rectangular machining opening 118 is situated within the center of the table 100. The left bracket 102 and the right bracket 104 are attached to the left 114 and right side 16 of the table 100 by way of a left pivot screw 120 and a right pivot screw 122. When the pivot screws (120 and 122) are loose, the table 100 is allowed to pivot, as shown in FIG. 4. The pivot screws (120 and 122) can subsequently be tightened to lock the table 94 in position.

The stage 96 incorporates a left stand 124 and a right stand 126. The left stand 124 includes a left pivot channel 128 and a left inlet 130. The left pivot channel 128 is vertically orientated, as shown in the figures. The left inlet 130 gives the left stand 124 an inverted "U" shape. As best shown in FIG. 4, the right stand 126 mirrors the left stand 124, having a right inlet 132, and a right pivot channel 134. As shown in the top cross sectional view of FIG. 10, the stands (124 and 126) are joined together by a front clamp buttress 136 and a rear clamp buttress 138. The two buttresses (136 and 138) provide stability for the router jig 16 when it is placed on a flat surface.

As shown in FIGS. 1, 3 and 4, the table assembly 94 is joined to the stage 96 by four positioning screws 140, two positioning screws 140 on the left side and two on the right side. In addition, the left pivot screw 120 and the right pivot screw 122 extends from the table assembly 94 out of the left pivot channel 128 and right pivot channel 134, respectively.

The stage 96 has upper position holes 142 and lower position holes 144 for receiving the positioning screws 140. The positioning screws 140 and positioning holes (142 and 144) allow for two vertical positions of the table assembly 94; a tenon generating position and a mortise generating position. The tenon generating position is characterized by the positioning screws 140 extending through the upper position holes 142 through the stands (124 and 126) into the brackets (102 and 104). To place the router jig 16 into the mortise generating position, the positioning screws 140 are removed, the table assembly is lowered, and the positioning screws 140 are threaded through the lower position holes 144 into the brackets (102 and 104). When the positioning screws 140 are removed the entire table assembly 94 can move upward and downward above the buttresses (136 and 138) and between the left and right stands (124 and 126). As the table assembly 94 moves up and down the pivot screws (120 and 122) follow within their respective pivot channels (128 and 134). Thus the table 100 remains free to pivot in both the tenon generating position and the mortise generating position.

The clamp assembly 98 of the preferred embodiment is illustrated in FIGS. 3, 4, 10 and 11. As shown in the figures, the clamp assembly allows the work piece 18 to be held in place as it is machined, whether a mortise or a tenon is to be formed. The clamp assembly 98 utilizes the front and rear buttresses (136 and 138), and further includes a clamp bar 146, a left handle assembly 148 and a right handle assembly 150. The left handle assembly 148 includes a left threaded rod 152 projecting from a left handle 154. The left threaded rod 152 is threaded through a threaded left bar aperture 156 in the front buttress 136. Like the left handle assembly 148, the right handle assembly 150 has a right handle 158 and a right threaded rod 160 that is threaded within a threaded right bar aperture 162. The clamp assembly operates by turning both handles (154 and 158) so that the clamp bar 146 moves towards or away from the rear buttress 138. The rear buttress 138 includes a vertically oriented rear clamp face 164. This rear clamp face 164 is parallel to a front clamp face 166 on the clamp bar 146.

Figure 10:
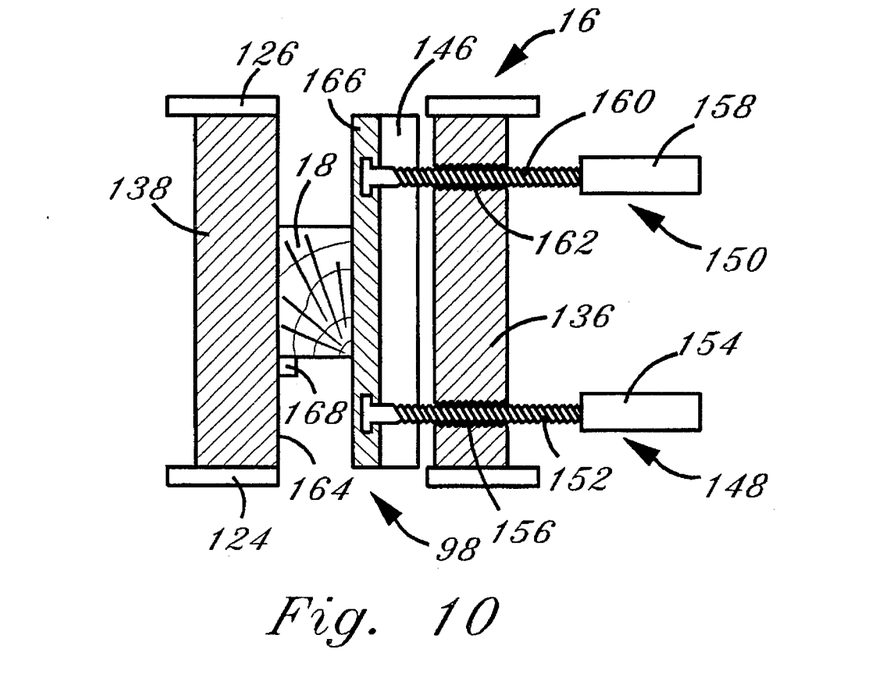
FIG. 10 is a top cross sectional view of the router jig taken along line 10—10 of FIG. 4, with a tenon work piece clamped therein.

FIGS. 1, 4 and 10 illustrate a guide member 168 which is attached to the rear clamp face 164 by a lockable clamp screw 170. The guide member 168 is designed to lockably rotate about the clamp screw 170 on the rear clamp face 164. This feature allows the work piece to be positioned in the clamp assembly 98 at a variety of angles. The clamp guide member 168 is rotated to the desired angle and the clamp screw 170 tightened, locking the guide member 168 in place. While the figures set forth the guide member 168 at an acute angle, the preferred embodiment 10 is constructed to allow for quick setup of the guide member 168 at horizontal and vertical orientations. The guide member 168 includes a member pin 172 and the clamp face includes a vertical face hole 174 and a horizontal face hole 176 displaced vertically and horizontally from the clamp screw 170, respectively. The guide member 168 can be removed and turned over so that the member pin 172 is inserted into the vertical face hole 174 or the horizontal face hole 176. The face holes (174 and 176) are positioned so that the guide member 168 is horizontal when the member pin 172 is in the horizontal face hole 176 and the clamp screw tightened, or vertical when the member pin 172 is in the vertical face hole 174 and the clamp screw tightened. This member pin 172—face hole (174 and 176) arrangement allows for quick and easy set up for machining a work piece 18 in either a horizontal or vertical position.

In order to machine the work piece be, the router jig 16 is set up prior to clamping the work piece 18 within the clamp assembly 98. This set up involves adjusting the router jig 16 so that the template 12 will be oriented parallel to, and below the table 100, as shown in FIG. 4. For a compound angle tenon, both the table 100 and the guide member 168 must be set to the appropriate angle and locked in place. For angled tenons the table 100 is tilted and locked in place, while the guide member 168 is maintained in a vertical position. For ninety degree tenons, the table 100 is horizontal and the guide member 168 is vertical.

Once the router jig 16 is set up, the vertical position of the table assembly 94 is adjusted by placing the router jig 16 in the tenon generating position as described above. To align the work piece be for machining, the router 26 is placed on the table top 106 and the work piece 18 positioned against the rear buttress 138 and the guide member 168. The work piece 18 is then raised until the tenon template top 46 contacts the router 26. In this position the template 12 should be parallel to the table 100 and aligned with the bearing collar 30 of the router bit 28. The handle assemblies (148 and 150) are then rotated until the clamp bar 146 moves and the work piece 18 is clamped between the clamp faces (164 and 166). The work piece 18 is then ready to be machined.

The work 18 piece is machined by turning on the router 26 and machining the work piece 18 down until the bearing collar 30 contacts the guide edge 54 of the tenon template 12. A partially machined work piece 18 is show in FIG. 4. The router bit 30 is guided around the guide edge 54 in a series of passes until the tenon 36 is finished. In the preferred embodiment 10 four passes are made. A first pass begins rearward from the work piece 18 and moves forward along the second end surface 44. A second pass begins in front of the work piece 18 and moves rearward along the first end surface 42. A third pass moves from left to right along the second side surface 40, following the contour of the tenon guide edge 54. The final pass is made from right to left along the first side surface 38, also following the guide edge 54, resulting in a finished tenon 36. This series of four passes has been found by the inventor to reduce destructive "chip-out" which can result in imperfect surfaces on the machined tenon 36 and its respective shoulder 34. The work piece 18 is then ready for removal by first removing the router 26 and then loosening the handle assemblies (148 and 150) and pulling the work piece 18 away from the router jig 16.

It would clear to one skilled in the art that while the description and associated figures show the router jig 16 positioned horizontally, the length or position of the work piece 18 may require the entire router jig 16 be situated other than horizontally. Because the router jig 16 would be clamped to the work piece 18 in such a position, the tenon 36 would still be machined in precisely the same manner, as described above. The only disadvantage to such a set up would be the awkwardness of using the router 26 at an odd angle.

The tenon template 12 is removed by threading the release screw 52 into the threaded aperture 50 until it extends out of the template bottom 48 and contacts the template plane 20 of the work piece 18, and forces the tenon template 12 away from the finished tenon 36. Eventually the template 12 is disengaged entirely. The finished work piece 18, with fully formed tenon 36, is then ready for use. As would be clear to one skilled in the art, the guide pin 24 or insertion hole 22 tolerances could be varied to allow hand removal of the template 12.

Figure 11:
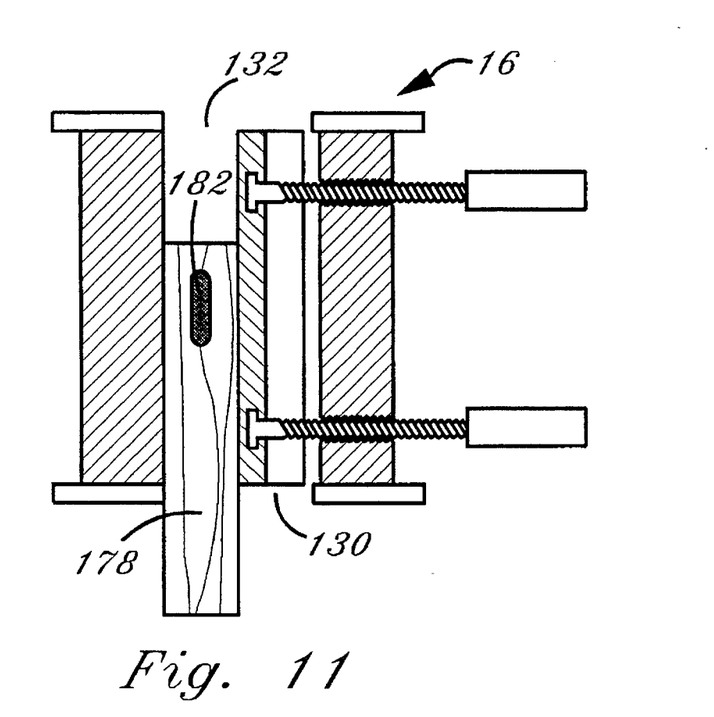
FIG. 11 is a top cross sectional view of the router jig with a mortise work piece having a finished mortise clamped therein.

The creation of mortises is similar to the creation of tenons. As depicted in FIG. 11, a mortise work piece 178 is inserted into the router jig 16 through one of the inlets (130 and 132). In the case of FIG. 11, it is the left inlet 130. The router 26 is equipped with a spiral bit 180 such as that shown in FIG. 12. The table assembly 94 is set in the mortise generating position and the guide member 168 adjusted as described for the creation of a tenon, to create a mortise 182 at the desired angle and depth. The mortise 182 shown in FIG. 11 is a ninety degree mortise, so both the table 100 and the guide member 168 (not shown in the figure as it is underneath the mortise work) were oriented horizontally when the mortise 182 was formed. In the preferred embodiment 10 the router 26 is a "plunge" router as is commonly used for the creation of mortises.

Figure 12:
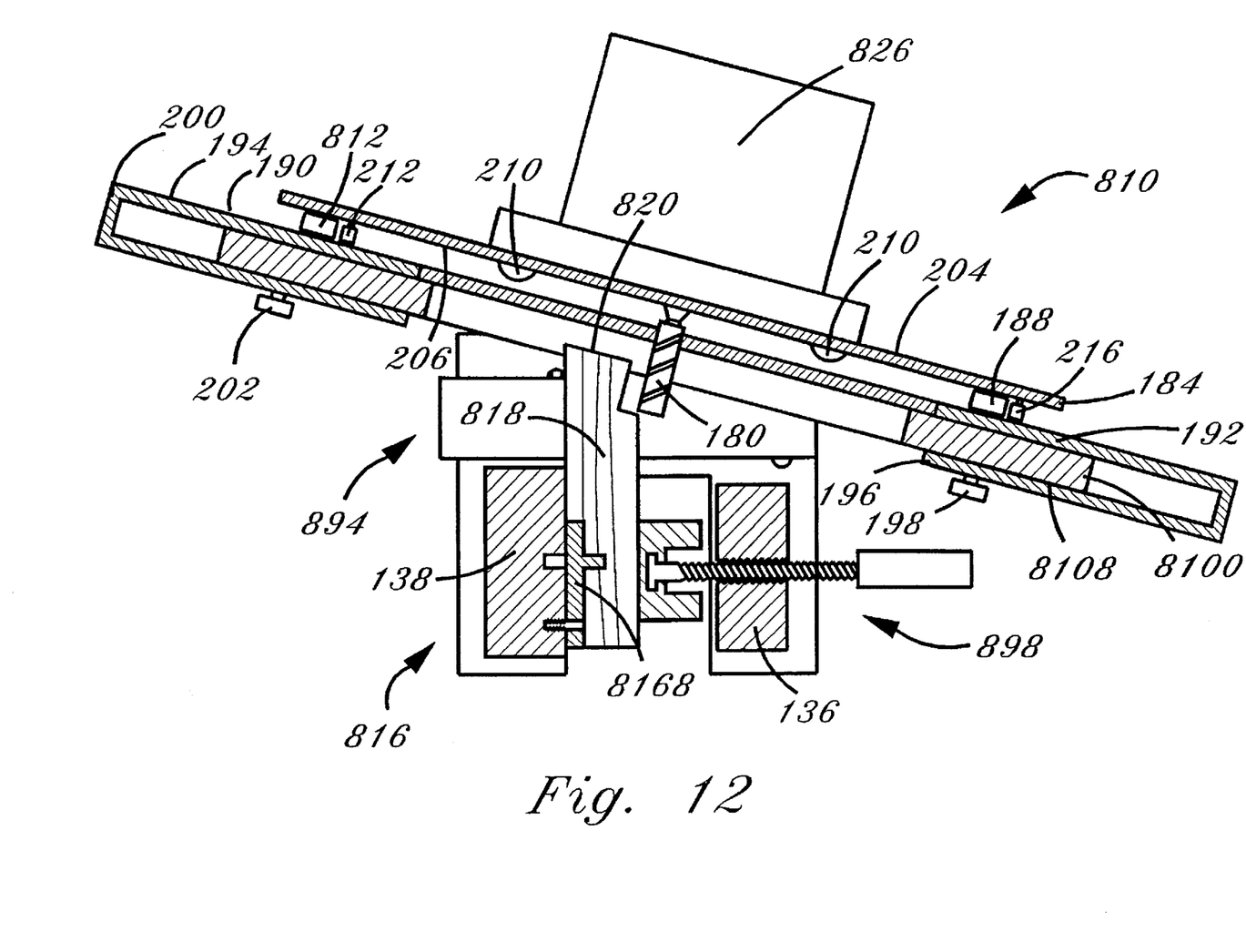
FIG. 12 is a side cross sectional view of an alternate embodiment.
Figure 13:
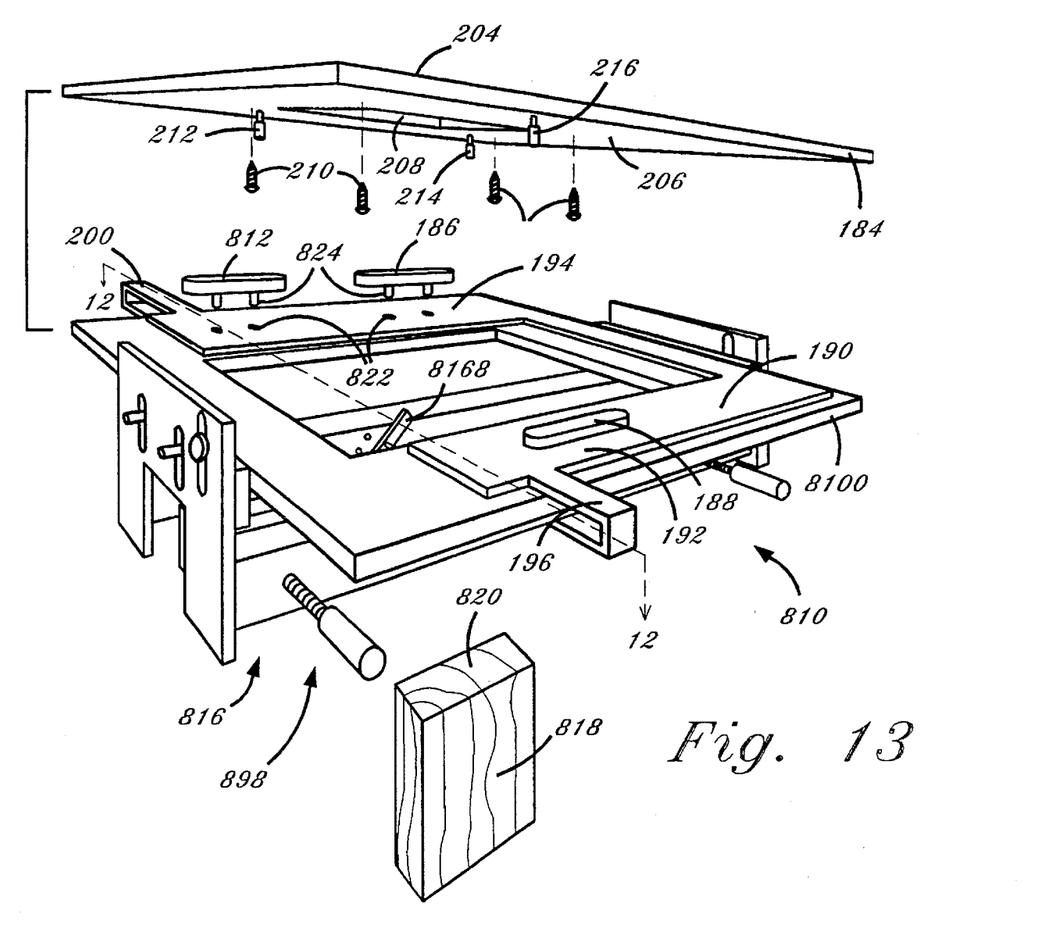
FIG. 13 is a perspective view of an alternate embodiment.

An alternative embodiment 810 is illustrated in the side cross sectional view of FIG. 12 and the perspective view of FIG. 13. The alternative embodiment 810 is, in many respects, similar to the preferred embodiment 10 illustrated in the other figures. To this end, components which are identical to those appearing in the preferred embodiment 10 will be referred to by reference numbers incorporating the original reference with an initial digit "8."

As shown in FIGS. 12 and 13, the alternate embodiment 810 has a router jig 816, a router attachment 184, a first tenon template 812, a second tenon template 186, and a third tenon template 188. Like the tenon template 12 of the preferred embodiment 10, the templates (812, 186 and 188) all have a pair of guide pins 824. All three templates (812, 186 and 188) of the alternate embodiment 810 are identically shaped. It would be obvious to one skilled in the art, however, that the third template could be shaped to include only the semi-circular ends of the template shape, and still function just as well. As is shown in the drawings, the clamp assembly 898 of the alternate embodiment 810 is identical to that of the preferred embodiment 10.

Unlike the preferred embodiment 10, the alternate embodiment 810 does not require a router bit 28 having a bearing collar 30. As is best illustrated in FIG. 12, the alternate embodiment 810 uses a spiral bit 180.

The router jig 816 of the alternate embodiment 810 is similar to that of the preferred embodiment 10, differing only in the design of the table 8100. As shown in FIGS. 12 and 13, the alternate embodiment 810 includes a template receiving sliding cover 190 that fits over the top of the table 8100. The sliding cover 190 has front arm 192 and a rear arm 194. As shown in FIG. 13, a first pair of insertion holes 822 and a second pair of insertion holes 822 are situated in the rear arm 194. A third pair of insertion holes (not shown in FIG. 7) is situated in the front arm 192. The dimensions of the three pairs of insertion holes 822 are identical, and designed to receive the three templates (812, 186 and 188). In FIG. 13 the first two templates (812 and 186) are poised above their respective insertion holes 822 while the third template 188 is shown inserted into its respective insertion holes. As shown in FIGS. 12 and 13, the sliding cover 190 includes a front table bracket 196 with a front bracket screw 198 and a rear table bracket 200 with a rear bracket screw 202. The sliding cover 190 is locked into place by screwing in the bracket screws (198 and 202) until they engage the table bottom 8108.

Like the preferred embodiment be, the creation of a tenon using the alternate embodiment 810 begins with a work piece 818 having a first cut that forms a machining plane 820 (identical to the template plane 20 in the preferred embodiment 10). The table 8100 is tilted and the guide member 8168 rotated according to the type of joint to be created, as described in the preferred embodiment 10.

In the alternate embodiment 810, once the work piece 818 is secured within the clamp assembly 898, and the table 8100 and guide member 8168 properly arranged, the sliding cover 190 is moved, with templates (812, 186 and 188) attached, until the work piece 818 is aligned below the sliding cover 190, in the center of an imaginary triangle formed by the three templates (812, 186 and 188).

In the alternate embodiment 810 the tenon 36 length is varied by adjusting the length of the spiral bit 180. There is no need to align a collar bearing with a guide edge.

As is evident in FIGS. 12 and 13, the alternate embodiment 810 utilizes a router 826 having the router attachment 184. The router attachment 184 is a rigid, flat structure, having an attachment side 204, an opposing outer side 206, a bit aperture 208, and securing screws 210. The router attachment 184 is connected to the router 826 by way of the securing screws 210 which extend through the attachment 184 into the router 826. The outer side 206 of the router attachment 184 has a first follower 212, a second 206 follower 214, and a third follower 216. The outer side of the router attachment 184 rests on, and slides upon, the templates (812, 186 and 188). The followers (212, 214 and 216) are constructed of a material that slides easily against the templates (812, 186 and 188). In the alternate embodiment 810 Teflon is used for the followers (212, 214 and 216). The followers (212, 214 and 216) are positioned such that an imaginary triangle formed by the first 212, second 214 and third 216 followers is the same as the triangle formed by the first 812, second 186, and third 188 templates.

The creation of the tenon is illustrated in FIG. 12. The router 826, with attachment 184, is placed on the table top 8106 with the spiral bit 180 extending into the machining opening 8118 next to the work piece 818, with the first 212, second 214 and third 216 followers adjacent to the first 812, second 186, and third 188 templates, respectively.

The router 826 is turned on and moved so that the followers simultaneously move around their respective templates. In a series of passes identical to preferred embodiment 10, the tenon is formed. Because the alternate embodiment 810 utilizes a spiral router bit 180, the undesirable effect of chip-out is reduced which may occur with the router bit 28 of the preferred embodiment 10.

Various other modifications and alterations of the dimensions, materials, orientation and usages may be made without departing from the invention. Those skilled in the art will readily recognize that the inventive system set forth above is not limited to the creation of only tenons, as the shape of the templates 12 can vary widely, including dovetail templates to create dovetail joints. The system is not limited to machining wood either. An appropriate change in the type of router and bit, and the addition of a cutting lubricant if necessary, would render the system applicable to a variety of other materials. Accordingly, the above disclosure is not to be considered as limiting and the appended claims are to be interpreted as encompassing the entire spirit and scope of the invention.

INDUSTRIAL APPLICABILITY

The tenon generating system of the present invention is designed to be used for the creation of tenons for mortise and tenon joints in wooden structures. The invention provides a more flexible or less expensive option than the presently available systems. In the preferred embodiment 10, the entire router jig 16 is constructed of aluminum. The drill guide of the preferred embodiment 10 is also constructed of aluminum. This provides for a relatively light piece of equipment. The dimensions of the router jig (25.4 cm×30.6 cm) and the drill guide (12.7 cm×7.62 cm) result in a very compact system. A variety of templates can be stored in a small block of wood having insertion holes, or carried loosely in a small container. Due to its compact nature, the present invention 10 is easy to store and particularly well suited for machining jobs away from a fully equipped shop.

The creation of mortise and tenon joints with the present system 10 is accomplished by positioning the work piece 18 in the router jig 16 and machining it as set forth above. A corresponding mortise 182 is then machined out of a mortise work piece 178 and the joint is ready for use. As was also set forth above the templates 12 may vary substantially in shape for the creation of more complex joining shapes, such as dovetail joints. As would be clear to one skilled in the art, such joints could be angled joints or compound angle joints.

The present system, particularly the alternate embodiment, is envisioned to be well suited for the creation of a large number of mortise and tenon joints. Once the router jig 16 is set up for one tenon or mortise, a number of identical mortises or tenons can be subsequently machined using the same settings.

Due to the increased flexibility and ease of use, it is expected that the present invention will enjoy immediate, long lasting and wide spread industrial applicability and commercial utility.

I claim:

1. A uniform tenon generation system for use in conjunction with a workpiece, said workpiece having a template plane formed on a surface thereof upon which the tenon is to be formed, said workpiece further having one or more guide holes, in and extending generally perpendicularly to said template plane, and a router for machining the workpiece, comprising:

at least one tenon template, each said tenon template including a surrounding guide edge disposed generally perpendicularly to said template plane and defining the exterior shape of a desired tenon;

one or more guide pins extending through said tenon template, each said guide pin being adapted to extend into each said guide hole; and guide following means for attachment to the router, said guide following means being adapted to follow the surrounding guide edge such that the router machines the tenon during a complete pass of said guide following means around said tenon template.

2. The uniform tenon generation system of claim 1 wherein each said tenon template further includes a bottom surface adapted to flatly abut against the template plane.

3. The uniform tenon generation system of claim 1 wherein the number of guide holes is two; and guide hole positioning means are provided for forming the guide holes in the work piece at a uniform separation, the uniform separation corresponding to the spacing of the guide pins in each of said tenon templates.

4. The uniform tenon generation system of claim 3 wherein the guide hole positioning means include a guidehole plate adapted to be mounted on the work piece.

5. The uniform tenon generation system of claim 1 wherein said guide following means is in the form of a bearing mounted on the shaft of the router at a position disposed along the shaft from a router bit.

6. The uniform tenon generation system of claim 1 wherein a plurality of said tenon templates is provided, the plurality including a selection of popular tenon outline shapes.

7. The uniform tenon generation system of claim 1 wherein each said guide pin has the form of a screw.

8. A uniform tenon generation system for use in conjunction with a workpiece, said workpiece having a template plane formed on a surface thereof upon which the tenon is to be formed, and a router for machining the workpiece, comprising:

at least one tenon template, each said tenon template including a surrounding guide edge disposed generally perpendicularly to said template plane and defining the exterior shape of a desired tenon;

adhesive means to secure a said tenon template to said template plane; and guide following means for attachment to the router, said guide following means being adapted to follow the surrounding guide edge such that the router machines the tenon during a complete pass of said guide following means around said tenon template.

9. A method for machining a workpiece using a router having a router bit with a bearing collar, comprising the steps of:

a) forming a machining plane on the workpiece;

b) providing a template having a vertically disposed guide edge and at least one vertically disposed guide pin;

c) drilling one hole corresponding to each said guide pin, said hole being arrayed to be generally perpendicular to the plane on the workpiece;

d) inserting said guide pins into the ones of said holes corresponding to said guide pins; and e) machining the workpiece with the router by guiding the router bit such that the bearing collar circumferentially contacts said template guide edge.

10. The method of claim 9 wherein:

step e) includes the following steps:

e1) providing a lockable tilting table with a router bit receiving aperture;

e2) tilting the table until it is generally parallel to the plane on the work piece; and e3) orienting the router with the router bit extending through the bit receiving aperture.

11. The method of claim 10 wherein:

step e) includes the following steps:

e4) providing a clamp having opposing clamp faces with a rotating lockable guide member thereon;

e5) placing the workpiece against the guide member;

e6) rotating the guide member until the machining plane is generally parallel with the table;

e7) locking the guide member in position; and e8) clamping the workpiece in position within the clamp.

12. The method of claim 9 wherein:

step c) includes providing drill means for drilling each said hole.

13. The method of claim 12 wherein:

the drill means includes a drill guide removably attachable to the workpiece for drilling each said hole in a hole pattern corresponding to the relation of each said guide pin to said template.

* * * * *